3,117,962
AZO DYES CONTAINING A HALOMETHYLBENZOYLAMINO RADICAL

Werner Rohland and Walter Mesch, Ludwigshafen (Rhine), and Dieter Ludsteck, Ludwigshafen (Rhine), Gartenstadt, and Wilhelm Federkiel, Frankenthal, Pfalz, Germany, assignors to Badische Anilin- & Soda-Fabrik Aktiengesellschaft, Ludwigshafen (Rhine), Germany
No Drawing. Filed Aug. 16, 1960, Ser. No. 49,839
Claims priority, application Germany Aug. 20, 1959
6 Claims. (Cl. 260—162)

This invention relates to new azo dyes, a process for the preparation of the same, and the use of the same for dyeing wool, silk, synthetic linear polyamides and cellulose. It is an object of this invention to provide new azo dyes which will dye textile materials of wool, silk, synthetic linear polyamides and especially cellulose in shades fast to washing. Textile materials include fibers, flock, threads, woven and non-woven textiles. As linear synthetic polyamides there may be specified nylon 6, nylon 66 and nylon 11. The term cellulose includes native cellulose, as for example cotton, and regenerated cellulose, as for example rayon and rayon staple.

Another object of this invention is to provide a process for the production of these new dyes.

The new dyes have the general formula:

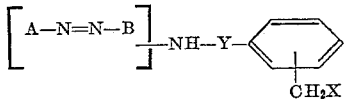

in which A represents a radical of one of the formulae:

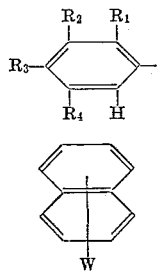

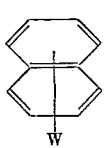

or

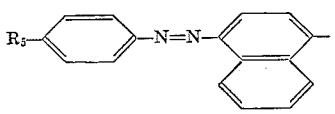

in which $R_1$ represents a hydrogen atom, a methyl, methoxy, ethoxy, nitro, sulfonic acid or sulfonic acid amide radical, $R_2$ represents a hydrogen atom, a sulfonic acid or sulfonic acid amide radical, $R_3$ represents a hydrogen or chlorine atom or a methyl, methoxy, ethoxy, nitro, acetylamino, benzoylamino, sulfonic acid, sulfonic acid amide, benzeneazo or 4-sulfobenzeneazo radical, $R_4$ represents a hydrogen or chlorine atom or a methoxy, sulfonic acid or sulfonic acid diethylamide radical, W represents a sulfonic acid radical in 4-, 6- or 7-position to the azo group and $R_5$ represents a hydrogen atom or a sulfonic acid radical, B represents one of the radicals of the formulae:

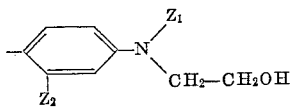

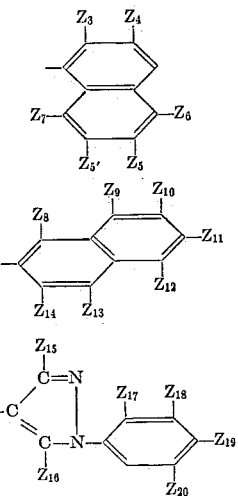

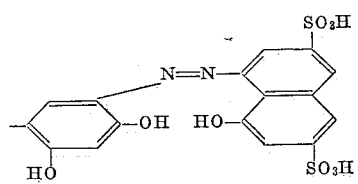

in which $Z_1$ represents a methyl or beta-hydroxyethyl radical, $Z_2$ a hydrogen or chlorine atom or a methyl radical, $Z_3$ a hydroxy, 2-hydroxyethylamino or amino radical, $Z_4$ a hydrogen atom or a sulfonic acid, carboxylic acid anilide or carboxylic acid-(beta-hydroxyethyl)-amide radical, $Z_5$ a hydrogen atom or a sulfonic acid radical, $Z_{5'}$ a hydrogen atom or a sulfonic acid radical, $Z_6$ a hydrogen atom or a hydroxy radical, $Z_7$ a hydrogen atom or a hydroxy or sulfonic acid radical, $Z_8$ a hydroxy or amino radical, $Z_9$ a hydrogen atom, a hydroxy, amino, acetylamino, sulfonic acid or benzoylamino radical, $Z_{10}$ a hydrogen atom or an amino radical, $Z_{11}$ a hydrogen atom or a sulfonic acid radical, $Z_{12}$ a hydrogen atom or a sulfonic acid radical, $Z_{13}$ a hydrogen atom or a sulfonic acid radical, $Z_{14}$ a hydrogen atom or a sulfonic acid radical, $Z_{15}$ a methyl or carboxylic acid amide radical, $Z_{16}$ a hydroxy or amino radical, $Z_{17}$ a hydrogen or chlorine atom or a methyl radical, $Z_{18}$ a hydrogen atom, a chlorine atom, a nitro radical, an amino radical or a sulfonic acid radical, $Z_{19}$ a hydrogen atom or a sulfonic acid radical and $Z_{20}$ a hydrogen or chlorine atom, X represents a chlorine or bromine atom and Y represents a —CO— or —SO$_2$— group, and the radical:

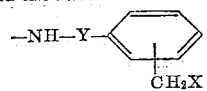

stands instead of the said substituents $R_3$, $Z_3$, $Z_{10}$, $Z_{11}$, $Z_{18}$ or $Z_{19}$.

These new dyes may be prepared in various ways.

Thus for example an azo dye of the general formula:

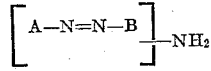

may be reacted with a carboxylic or sulfonic acid halide of the general formula:

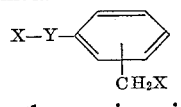

A, B, X and Y having the meanings given above. This reaction is carried out in aqueous solution or suspension, in organic diluents, for example methanol, ethanol, acetone, or in mixtures of water and one or more of the said organic diluents, at room temperature or elevated temperature, for example 30° to 100° C., and preferably in the presence of an acid-binding substance. Acid-binding substances include sodium or potassium hydroxide, carbonate, bicarbonate or acetate, calcium or magnesium oxide or tertiary amines, such as pyridine or triethylamine.

Carboxylic and sulfonic acid halides of Formula III are obtained in the usual way, for example by treating toluene carboxylic acid halides or toluene sulfonic acid halides, as for example 4-toluene carboxylic acid chloride, 3-toluene carboxylic acid bromide, 2-toluene carboxylic acid chloride or 4-toluene sulfonic acid chloride, with chlorine or bromine or by chlormethylating toluene sulfonic or carboxylic acids and converting the resultant sulfonic or carboxylic acids into the corresponding acid chlorides. Toluene sulfonic or carboxylic acids can also be treated with chlorine or bromine and the reaction products converted into the sulfonic or carboxylic acid chlorides or bromides.

The azo dyes of the general Formula II may bear the acylatable amino groups in the coupling component or in the diazo component. Azo dyes which bear the amino group in the diazo component are obtained for example by coupling diazotized 1-amino-4-acetylaminobenzene-3-sulfonic acid with 1-hydroxybenzene-4-sulfonic acid, 1-hydroxynaphthalene-4-sulfonic acid or 2-hydroxynaphthalene-8-sulfonic acid and splitting off the acetyl group from the azo dye formed in the usual way.

Azo dyes which contain the amino group in the coupling component are obtained for example by coupling diazotized aromatic amines with aniline or toluidine or 1-hydroxy-8-aminonaphthalene-3,6-disulfonic acid in an acid medium.

Suitable carboxylic and sulfonic acids include 4-chlormethylbenzoyl chloride, 3-chlormethybenzoyl chloride, 2-chlormethylbenzoyl chloride, 5-bromomethylbenzoyl bromide, 3-bromomethylbenzoyl bromide, 4-chlormethylbenzene sulfonic acid chloride, 3-chlormethylbenzene sulfonic acid chloride, 4-bromomethylbenzene sulfonic acid bromide and 3-bromomethyl benzene sulfonic acid bromide.

Another possibility for the production of the new dyes resides in the coupling of a diazotized amine of the general formula:

$$A—NH_2 \qquad IV$$

with a compound capable of coupling of the general formula:

V in which A, B, X and Y have the meanings given above.

The coupling is carried out in the way usual for the production of azo dyes from diazotized amines and compounds capable of coupling, for example in aqueous medium and while cooling.

Compounds capable of coupling of the Formula V include 1-hydroxy-4-(4-chlormethylbenzoylamino)-naphthalene-3,6-disulfonic acid, 1-hydroxy-4-(3-bromo-methylbenzoylamino)-naphthalene-3,5-disulfonic acid, 1-(3-(3-chlormethylbenzenesulfonylamino)-phenyl)-3-methylpyrazolone-(5) and 1-hydroxy-6-(2-chlormethylbenzoylamino)-naphthalene-3-sulfonic acid.

These compounds are obtained by reacting carboxylic acid halides or sulfonic acid halides of the Formula III with the corresponding compounds capable of coupling which contain amino groups, of the formula:

$$H—B—NH_2 \qquad VI$$

The reaction conditions are the same as given above for the reaction of the halides of Formula III with the azo dyes of Formula II.

A third method for the production of the new azo dyes consists in coupling diazotized amines of the general formula:

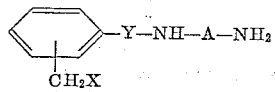

VII with compounds capable of coupling of the general formula:

$$H—B \qquad VIII$$

In this case also, coupling is carried out under the conditions usual for the production of azo dyes for example in an aqueous medium and while cooling.

Diazotizable amines of Formula VII include 4-(4-chlormethylbenzoylamino)-1-aminobenzene-2-sulfonic acid, 4-(3-bromomethylbenzoylamino)-1-aminobenzene-2-sulfonic acid and 4-(3-chlormethylbenzenesulfonylamino)-1-aminobenzene-2-sulfonic acid.

These compounds are obtained for example by reacting one mol of the corresponding diamino compound, for example 1,4-diaminobenzene-2-sulfonic acid, with one mol of a carboxylic or sulfonic acid halide of the general Formula III at room temperature and in the presence of acid-binding substances.

With the new azo dyes of the Formula I, the abovementioned textile materials can be dyed in a long bath and also by padding or printing. Padding and printing are the preferred methods of dyeing. Furthermore, synthetic or semi-synthetic substances such as nylon 6, or nylon 66 may be dyed with the new dyes of this invention by conventional spin dyeing methods.

Of the new dyes, those are especially preferred which contain one or more sulfonic acid groups in the molecule.

When dyeing with the new dyes, the procedure may for example be that cotton is padded with an aqueous solution of the dye and, preferably after drying, led through a bath which contains a basic-reacting substance, such as sodium hydroxide, sodium carbonate, sodium hydrogen carbonate, potassium hydroxide or potassium carbonate, possibly also neutral salts, such as sodium chloride and sodium sulfate. The dye is then fixed on the fiber by steaming for a short time. Instead of steaming, there may also be used a treatment with air at 50° to 200° C., preferably at 90° to 150° C. The basic-reacting substance and possibly the neutral salts may however be added to the padding bath. Furthermore, cotton for example may be dyed from an aqueous bath with the dye with the addition of basic-reacting substances and neutral salts at 20° to 30° C., and the dye fixed by gradually raising the bath temperature. Finally, cellulosic materials may be treated with aqueous solutions of basic-reacting substances, then padded with a dye of the said kind and the dyeing then fixed.

In printing structures containing cellulose, the dyes, advantageously together with the usual thickening agents, such as sodium alginate or tragacanth, possibly together with a usual printing auxiliary, and basic-reacting substances of the said kind, are applied; the material to be printed is dried and steamed for a short time. The dye may also be printed onto the structure together with thickening agents and conventional printing auxiliaries, the structures dried, led through a bath charged with basic-reacting substances, again dried and then steamed.

Dyeings and prints with very good wet fastness are obtained.

The following examples will further illustrate this invention but the invention is not restricted to these examples. The parts and percentages are units of weight. Where parts by volume are referred to, these bear the same relation to the parts by weight as the liter does to the kilogram under normal conditions.

*Example 1*

20 to 22 parts of 1-chlormethylbenzene-4-carboxylic acid chloride are added with vigorous stirring to a suspension of 31.9 parts of 1-amino-8-hydroxynaphthalene- 3,6-disulfonic acid and 250 parts by volume of water and the pH is kept at 4 to 5 by allowing a 50% aqueous solution of sodium acetate to flow into the mixture. After about five hours stirring, the deposited precipitate is filtered off, washed with 10% sodium chloride solution and dried. About 33 parts of the compound of the formula:

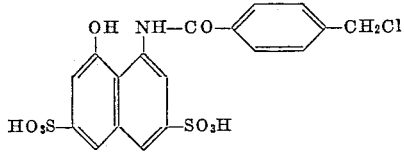

are obtained in the form of a grey powder.

Further coupling components are obtained by reacting 1-amino-8-hydroxynaphthalene-3,6-disulfonic acid with 3-chlormethylbenzene carboxylic acid chloride. 4-chlormethylbenzene sulfonic acid chloride, 2-chlormethylbenzene carboxylic acid chloride or 4-bromomethylbenzene carboxylic acid bromide.

Further coupling components are obtained by using 2-amino-8-hydroxynaphthalene-6-sulfonic acid, 2-amino-5-hydroxynaphthalene-7-sulfonic acid, 2-hydroxynaphthalene-3 - carboxylic acid - (3-amino - phenylamide), 1 - (3-aminophenyl)-3-methylpyrazolone - (5) or 1 - (4 - aminophenyl)-3-methylpyrazolone-(5) instead of 1-amino-8-hydroxynaphthalene-3,6-disulfonic acid.

The coupling components of the above specified formula can be directly fixed on the fiber, for example by padding cotton fabric with an aqueous solution which contains in 1000 parts by volume 20 parts of the coupling component and 4.5 parts of sodium hydroxide, drying the fabric and then steaming it for 5 minutes at 100° C. or treating it with hot air at 140° C. for 5 minutes. The padded material is then rinsed and soaped. Thereafter it is padded with an aqueous solution which contains in 1000 parts by volume 5 parts of diazotized 1-aminobenzene-4-sulfonic acid. A violet dyeing is obtained with very good wet fastness properties.

Similar dyeings are obtained when the coupling components and the diazotized amines of the following table are used in the same way for dyeing cotton fabric. The shade given in the right-hand column refers to the finished dyeing.

| Diazo component | Coupling component | Shade |
|---|---|---|
| 1-amino-2-nitrobenzene | 1-hydroxy-8-(4-chlormethyl-benzoylamino) naphthalene-3,6-disulfonic acid. | Bordeaux. |
| 1-amino-2-methoxy-benzene | do | Do. |
| 1-amino-2-ethoxybenzene | do | Do. |
| 1-amino-2-methylbenzene | do | Do. |
| 1-aminobenzene-2-sulfonic acid amide. | do | Red. |
| 1-aminobenzene-3-sulfonic acid | do | Do. |
| 1-aminobenzene-3-sulfonic acid amide. | do | Do. |
| 1-amino-4-nitrobenzene | do | Violet. |
| 1-amino-4-methylbenzene | do | Bluish red. |
| 1-amino-4-methoxybenzene | do | Violet. |
| 1-amino-4-ethoxybenzene | do | Do. |
| 4-amino-azobenzene | do | Do. |
| 4-amino-azobenzene-4'-sulfonic acid. | do | Do. |
| 1-amino-4-sulfonic acid. | do | Red. |
| 1-amino-4-chlorbenzene | do | Reddish violet. |
| 1-amino-4-acetylamino-benzene | do | Violet. |
| 1-amino-2-methoxy-5-chlorbenzene | do | Do. |
| 1-aminobenzene-2,5-disulfonic acid. | do | Red. |
| 1-amino-2-methoxy-benzene-5-sulfonic acid. | do | Reddish violet. |
| 1-amino-2-methoxy-benzene-5-sulfonic acid diethylamide. | do | Do. |
| 1-aminonaphthalene-4-sulfonic acid. | do | Violet. |
| 1-aminonaphthalene-6-sulfonic acid. | do | Do. |
| 1-aminonaphthalene-7-sulfonic acid. | do | Do. |
| 1-amino-4-benzeneazo naphthalene. | do | Bluish black. |
| 1-amino-4-(4-sulfobenzeneazo) naphthalene. | do | Do. |
| 1-amino-2,5-dimethoxy-4-benzoylamino benzene. | do | Do. |
| 1-amino-2,5-diethoxy-4-benzoylamino benzene. | do | Do. |

| Diazo component | Coupling component | Shade |
|---|---|---|
| 1-amino-2-nitrobenzene | 1-hydroxy-8-(4-chlormethylbenzoylamino) naphthalene-3,5-disulfonic acid. | Bordeaux. |
| 1-amino-2-methoxybenzene | do | Reddish violet. |
| 1-amino-2-ethoxybenzene | do | Do. |
| 1-amino-2-methylbenzene | do | Bluish red. |
| 1-aminobenzene-2-sulfonic acid amide. | do | Do. |
| 1-aminobenzene-3-sulfonic acid | do | Red. |
| 1-aminobenzene-3-sulfonic acid amide. | do | Do. |
| 1-amino-4-nitrobenzene | do | Reddish violet. |
| 1-amino-4-methylbenzene | do | Bluish red. |
| 1-amino-4-methoxybenzene | do | Violet. |
| 1-amino-4-ethoxybenzene | do | Do. |
| 4-aminoazobenzene | do | Do. |
| 4-aminoazobenzene-4'-sulfonic acid | do | Do. |
| 4-aminobenzene-4-sulfonic acid amide. | do | Red. |
| 1-amino-4-chlorbenzene | do | Reddish violet. |
| 1-amino-4-acetylaminobenzene | do | Violet. |
| 1-amino-2-methoxy-5-chlorbenzene | do | Do. |
| 1-aminobenzene-2,5-disulfonic acid | do | Red. |
| 1-amino-2-methoxybenzene-5-sulfonic acid. | do | Reddish violet. |
| 1-amino-2-methoxybenzene-5-sulfonic acid diethylamide. | do | Do. |
| 1-aminonaphthalene-4-sulfonic acid. | do | Violet. |
| 1-aminonaphthalene-6-sulfonic acid. | do | Do. |
| 1-aminonaphthalene-7-sulfonic acid. | do | Do. |
| 1-amino-4-benzeneazo naphthalene. | do | Bluish black. |
| 1-amino-4-(4-sulfobenzeneazo) naphthalene. | do | Do. |
| 1-amino-2,5-dimethoxy-4-benzoylaminobenzene. | do | Do. |
| 1-amino-2,5-diethoxy-4-benzoylaminobenzene. | do | Do. |
| 1-amino-2-nitrobenzene | 1-hydroxy-6-(4-chlormethylbenzoylamino) naphthalene-3-sulfonic acid. | Red. |
| 1-amino-2-methoxybenzene | do | Do. |
| 1-amino-2-ethoxybenzene | do | Do. |
| 1-amino-2-methylbenzene | do | Do. |
| 1-aminobenzene-2-sulfonic acid amide. | do | Do. |
| 1-aminobenzene-3-sulfonic acid | do | Do. |
| 1-aminobenzene-3-sulfonic acid amide. | do | Do. |
| 1-amino-4-nitrobenzene | do | Do. |
| 1-amino-4-methylbenzene | do | Do. |
| 1-amino-4-methoxybenzene | do | Do. |
| 1-amino-4-ethoxybenzene | do | Do. |
| 4-amino-azobenzene | do | Bluish red. |
| 4-amino-azobenzene-4'-sulfonic acid | do | Do. |
| 1-aminobenzene-4-sulfonic acid amide. | do | Red. |
| 1-amino-4-chlorbenzene | do | Do. |
| 1-amino-4-acetylaminobenzene | do | Do. |
| 1-amino-2-methoxy-5-chlorbenzene | do | Do. |
| 1-aminobenzene-2,5-disulfonic acid. | do | Do. |
| 1-amino-2-methoxybenzene-5-sulfonic acid. | do | Do. |
| 1-amino-2-methoxybenzene-5-1-aminonaphthalene-6-sulfonic acid. | do | Bluish red. |
| 1-aminonaphthalene-7-sulfonic acid. | do | Do. |
| 1-amino-4-benzeneazo naphthalene. | do | Violet. |
| 1-amino-4-(4-sulfobenzeneazo) naphthalene. | do | Do. |
| 1-amino-2,5-dimethoxy-4-benzoylamino benzene. | do | Do. |
| 1-amino-2,5-diethoxy-4-benzoylamino benzene. | do | Do. |

The dye may also be prepared first, by coupling 8.65 parts of 1-aminobenzene-4-sulfonic acid, diazotized in the usual way, with a neutral aqueous solution of one of the above-described coupling components at pH 6 to 7, adding such an amount of hydrochloric acid that a pH of about 4 is set up and completing the separation of the dye by adding sodium chloride. The deposited dye is filtered off by suction, washed with 10% sodium chloride solution and then dried. The dye thus obtained can be fixed on the fiber for example as follows: cotton fabric is padded with an aqueous solution which contains 20 parts of this dye in 1000 parts by volume. Then the fabric is squeezed to 90% moisture content and dried.

Then it is led through a second padding bath which contains 15 parts of sodium hydroxide and 200 parts of sodium chloride in 1000 parts by volume, squeezed, steamed for 5 minutes at 100° C. and soaped at the boil. Dyeings with very good wet fastness are obtained.

Example 2

9.5 parts of 1-chlormethylbenzene-4-carboxylic acid chloride are added to a mixture of 9.4 parts of 1,4-diaminobenzene-3-sulfonic acid and 100 parts by volume of water and while stirring powerfully saturated aqueous sodium acetate solution is allowed to flow in in such an amount that a pH of 4 to 5 is set up in the mixture. After 4 to 5 hours, the -1(4-chlormethylbenzoylamino)-4-aminobenzene-3-sulfonic acid obtained in the form of a grey precipitate is filtered off, dissolved in 200 parts of 2% hydrochloric acid and diazotized with a solution of 3.5 parts of sodium nitrite in 50 parts of water. This diazo solution is added gradually to a solution of 16 parts of 1-amino-8-hydroxynaphthalene-3,6-disulfonic acid in 200 parts of water, a pH of 6 to 7 being maintained by adding sodium carbonate solution. The dye formed is precipitated with excess sodium chloride and dried. It is obtained in the form of a violet powder and dyes cotton violet shades of good wet fastness from an alkaline bath.

Dyes having similar properties are obtained by using, instead of 1-amino-8-hydroxynaphthalene-3,6-disulfonic acid, the coupling components specified in the following table. The shade given in the right-hand column relates to the finished dye.

| Coupling component | Shade |
|---|---|
| N,N-bis-(2-hydroxyethyl)aminobenzene | Reddish volet. |
| 1-[NN-bis-(2-hydroxyethyl) amino]-3-methylbenzene | Red. |
| 1-[N,N-bis-(2-hydroxyethyl) amino]-3-chlorbenzene | Reddish violet. |
| 1-(2-hydroxyethylamino) naphthalene | Violet. |
| N-methyl-N-(2-hydroxyethyl) aminobenzene | Red. |
| 2-hydroxynaphthalene | Do. |
| 2-hydroxynaphthalene-8-sulfonic acid | Do. |
| 2-hydroxynaphthalene-6-sulfonic acid | Do. |
| 2-hydroxynaphthalene-3,6-disulfonic acid | Do. |
| 2-hydroxynaphthalene-3-carboxylic acid (2-hydroxyethylamide) | Do. |
| 2-hydroxynaphthalene-3-carboxylic acid anilide | Do. |
| 1-hydroxy-8-benzoylaminonaphthalene-3,6-disulfonic acid. | Bluish red. |
| 1-hydroxy-8-acetylaminonaphthalene-3,6-disulfonic acid. | Do. |
| 1-hydroxy-6-aminonaphthalene-3-sulfonic acid | Orange. |
| 1-hydroxy-6-acetylaminonaphthalene-3-sulfonic acid | Do. |
| 1-hydroxy-7-aminonaphthalene-3-sulfonic acid | Red. |
| 1-hydroxynaphthalene | Do. |
| 1-hydroxynaphthalene-4-sulfonic acid | Do. |
| 1-hydroxynaphthalene-3,8-disulfonic acid | Do. |

| Coupling component | Shade |
|---|---|
| 1-hydroxy-8-acetylaminonaphthalene-3,5-disulfonic acid. | Bluish red. |
| 1,8-dihydroxynaphthalene-3,6-disulfonic acid | Red. |
| 1-phenyl-3-methylpyrazolone-(5) | Yellow. |
| 1-phenyl-3-methyl-5-aminopyrazole | Do. |
| 1-phenylpyrazolone-(5)-carboxylic acid amide-(3) | Do. |
| 1-(2,5-dichlorphenyl)-3-methylpyrazolone-(5) | Do. |
| 1-(4-sulfophenyl)-3-methylpyrazolone-(5) | Do. |
| 1-(3-methylphenyl)-3-methylpyrazolone-(5) | Do. |
| 1-(3-sulfophenyl)-3-methylpyrazolone-(5) | Do. |
| 1-(3-chlorphenyl)-3-methylpyrazolone-(5) | Do. |
| 1-(3-nitrophenyl)-3-methylpyrazolone-(5) | Do. |
| 1-(4-chlorphenyl)-3-methylpyrazolone-(5) | Do. |
| 1-(4-nitrophenyl)-3-methylpyrazolone-(5) | Do. |
| 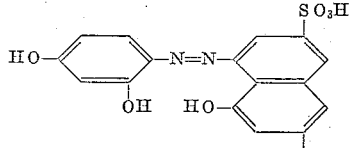 | Brown. |

Example 3

23 parts of 1-acetylamino-4-aminobenzene-3-sulfonic acid are diazotized in the usual way and the diazo solution is coupled with 22.4 parts of 1-hydroxynaphthalene-4-sulfonic acid. By adding 50 parts of 35% hydrochloric acid and excess sodium chloride, the dye formed is precipitated and, after filtration, is stirred in the form of an aqueous paste together with 1000 parts by volume of a 10% aqueous sodium hydroxide solution for an hour at 90° to 100° C. Then such an amount of hydrochloric acid is added to the mixture that a pH of about 4 is set up and the deposited precipitate is filtered off. It is made into an aqueous paste with 500 parts by volume of water; to this paste there are added with powerful stirring 20 to 25 parts of 1-chlormethylbenzene-4-carboxylic acid chloride, such an amount of saturated aqueous sodium acetate solution being allowed to flow in that a pH of 4 to 5 is set up in the mixture. After 4 to 5 hours, the dye formed is precipitated with excess sodium chloride, filtered, washed with dilute sodium chloride solution and dried. 60 parts of a red powder are obtained which dyes cotton clear red shades of excellent wet fastness.

Dyes of similar properties are obtained in the same way from the azo dyes prepared in analogous manner and the acylating agents in the following table.

| Example | Azo dyestuff | Acylating agent | Shade |
|---|---|---|---|
| 4 | 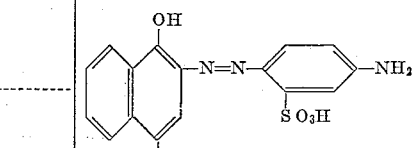 | 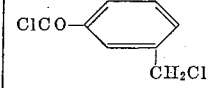 | Red. |
| 5 | 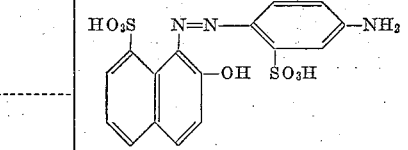 | 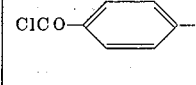 | Do. |
| 6 | 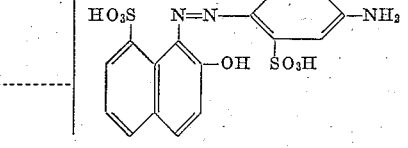 | 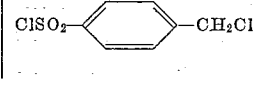 | Orange. |

| Example | Azo dyestuff | Acylating agent | Shade |
|---|---|---|---|
| 7 | C₆H₅—CO—NH, OH, HO₃S, SO₃H, SO₃H, —N=N—, —NH₂ naphthalene-benzene system | ClSO₂—⌬—CH₂Cl | Violet. |
| 8 | C₆H₅—CO—NH, OH, HO₃S, SO₃H, SO₃H, —N=N—, —NH₂ naphthalene-benzene system | Cl—CO—⌬—CH₂Cl | Do. |
| 9 | C₆H₅—CO—NH, OH, HO₃S, SO₃H, SO₃H, SO₃H, —N=N—, —NH₂ naphthalene-benzene system | Cl—CO—⌬—CH₂Cl | Do. |
| 10 | CH₃-pyrazolone (N-phenyl-SO₃H), —N=N—, —NH₂, SO₃H on middle ring | Cl—CO—⌬—CH₂Cl | Yellow. |
| 11 | CH₃-pyrazolone (N-phenyl-SO₃H), —N=N—, —NH₂, SO₃H | Cl—CO—⌬—CH₂Cl | Do. |
| 12 | CH₃-pyrazolone (N-phenyl-SO₃H), —N=N—, —NH₂, SO₃H | Cl—CO—⌬—CH₂Cl | Do. |
| 13 | CH₃-pyrazolone (N-(CH₃,SO₃H-phenyl)), —N=N—, —NH₂, SO₃H | Cl—CO—⌬—CH₂Cl | Do. |
| 14 | CH₃-pyrazolone (N-(CH₃,SO₃H-phenyl)), —N=N—, —NH₂, SO₃H | Cl—SO₂—⌬—CH₂Cl | Do. |

We claim:
1. An azo dye of the formula

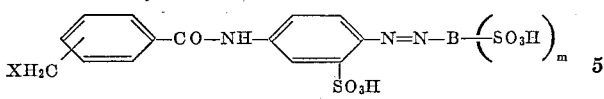

wherein:
X is a member selected from the class consisting of chlorine and bromine,
m is an integer of from 0 to 2, inclusive, and
B is a coupling component selected from the class consisting of the naphthalene, phenylazo-naphthalene and 1-phenyl-pyrazalone-(5) radicals in which the substituents are limited to members selected from the class consisting of hydrogen, hydroxy, methyl, chlorine, nitro, carbamyl, amino, acetylamino, benzoylamino, hydroxyethylamino, hydroxyethylaminocarbonyl and phenylaminocarbonyl.

2. The azo dye of the formula

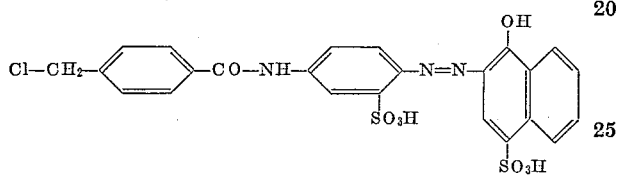

3. The azo dye of the formula

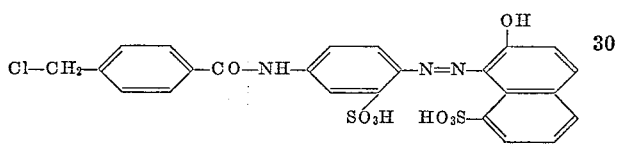

4. The azo dye of the formula

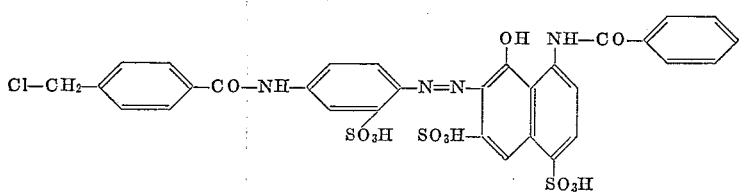

5. The azo dye of the formula

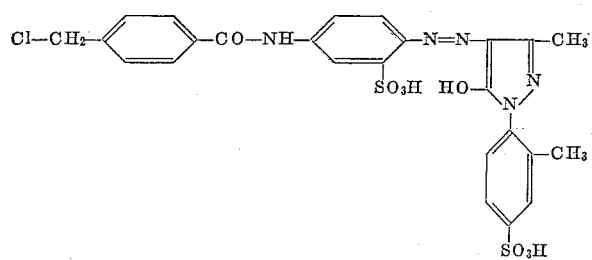

6. The azo dye of the formula

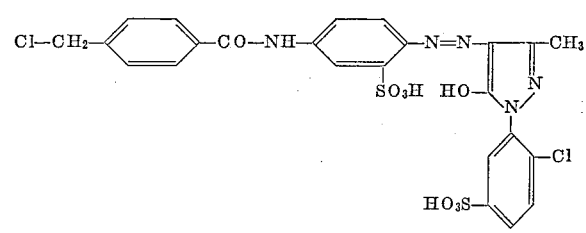

References Cited in the file of this patent
UNITED STATES PATENTS

| | | |
|---|---|---|
| 2,254,602 | Fleischhauer et al. | Sept. 2, 1941 |
| 2,931,795 | Heckendorn et al. | Apr. 5, 1960 |

UNITED STATES PATENT OFFICE
CERTIFICATE OF CORRECTION

Patent No. 3,117,962                      January 14, 1964

Werner Rohland et al.

It is hereby certified that error appears in the above numbered patent requiring correction and that the said Letters Patent should read as corrected below.

Column 6, in the table, first column, line 65 thereof, after "-5-" insert -- sulfonic acid diethylamide --; columns 9 and 10, in the table, second column, third formula thereof, lower left-hand portion thereof, strike out "$HO_3S$-"; same table, second column, sixth formula thereof should appear as shown below instead of as in the patent:

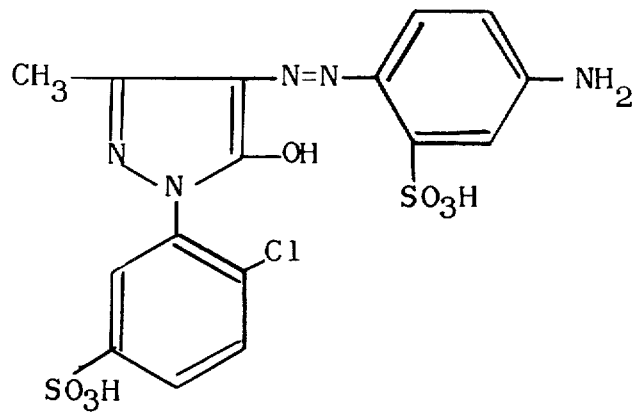

Signed and sealed this 11th day of August 1964.

(SEAL)
Attest:

ERNEST W. SWIDER                      EDWARD J. BRENNER
Attesting Officer                  Commissioner of Patents